Figure 1:
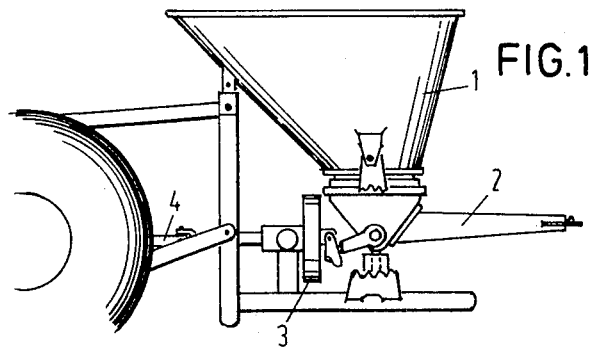

United States Patent [19]

Oosterling et al.

[11] 3,942,726

[45] Mar. 9, 1976

[54] DEVICE FOR SPREADING DISTRIBUTABLE MATERIAL COMPRISING A RECIPROCATORILY SWINGING DISTRIBUTOR PIPE

[75] Inventors: Pieter Adriaan Oosterling, Nieuw-Vennep; Johannes Philippus Hooftman, Hoofddorp, both of Netherlands

[73] Assignee: H. Vissers B.V., Nieuw-Vennep, Netherlands

[22] Filed: Nov. 6, 1974

[21] Appl. No.: 521,475

[30] Foreign Application Priority Data
Nov. 8, 1973 Netherlands.................... 7315341
July 9, 1974 Netherlands.................... 7409280

[52] U.S. Cl. ............... 239/659; 239/689; 239/524
[51] Int. Cl.² ...................................... A01C 15/00
[58] Field of Search ........... 239/650, 652, 659, 688, 239/689, 518, 524, 101, 102, 670; 222/196, 409

[56] References Cited
UNITED STATES PATENTS

| 880,908 | 3/1908 | Niebel................................ 239/659 |
| 935,734 | 10/1909 | Bessen................................ 239/659 |
| 2,969,862 | 1/1961 | Worrell............................. 239/650 X |
| 3,529,941 | 9/1970 | Tobiassen et al................ 239/524 X |
| 3,837,407 | 9/1974 | Jan De Koning et al. ....... 239/659 X |

FOREIGN PATENTS OR APPLICATIONS

| 556,676 | 4/1957 | Belgium............................. 239/659 |
| 193,009 | 9/1937 | Switzerland....................... 239/650 |

*Primary Examiner*—Evon C. Blunk
*Assistant Examiner*—Andres Kashnikow
*Attorney, Agent, or Firm*—Snyder, Brown and Ramik

[57] ABSTRACT

The invention relates to a device for spreading distributable material, for example, fertilizer, comprising a hopper containing the material and having an outlet port, communicating with a distributor pipe adapted to swing to and fro, to which a bracket is fastened; the bracket favorably affecting the distribution pattern of the material to be deposited. The invention has for its object to improve the action of the distributor pipe so that a more advantageous distribution pattern is obtained; the invention provides a device in which the bracket holds a deflection member arranged behind the exhaust opening of the distributor pipe, viewed in the direction of flow of the material, the operative surface of the member being at an acute angle to the direction of flow; a further object of the invention is to improve the connection between the bracket with the deflection member and the end of the distributor pipe so that a ready exchange becomes possible.

10 Claims, 5 Drawing Figures

DEVICE FOR SPREADING DISTRIBUTABLE MATERIAL COMPRISING A RECIPROCATORILY SWINGING DISTRIBUTOR PIPE

The invention relates to a device for spreading distributable material, for example, fertilizer, comprising a hopper containing said material and having an outlet port which communicates with a distributor pipe adapted to swing to and fro, to which is fastened a bracket at a distance around the outlet port.

A device of the kind set forth is usually drawn by a vehicle or carried by said vehicle, but it may alternatively be self-propelled. It is common practice to spread the material during the runs over a given width behind the vehicle on the field. In this way the field is covered strip-wise with the material to be deposited. It is important to obtain on each strip a distribution pattern of the material such that after a few runs have been made, which may involve partial overlap of the strips, the material is uniformly distributed across the field. In order to favorably affect the distribution pattern it is known to arrange a bracket around the outlet port of the distributor pipe for varying the path of the material during the ejection.

The invention has for its object to improve the action of the distributor pipe so that a more advantegeous distribution pattern is obtained.

The invention provides a device in which the bracket holds a deflection member arranged behind the exhaust opening of the distributor pipe, viewed in the direction of flow of the material, the operative surface of said member being at an acute angle to said direction of flow.

A further object of the invention is to improve the connection between the bracket with the deflection member and the end of the distributor pipe so that a ready exchange becomes possible. In practice it has been found that after some time of use, the bracket with the deflection member has worn down to an extent such that the distribution pattern to be acted upon by said elements changes to an undesirable extent. It is necessary, therefore, to replace the bracket from time to time. Nevertheless, the bracket should be secured to the pipe so that the positions of the bracket and of the deflection member relative to the exhaust end of the pipe do not change, which is the more important when the bracket is made from elastic material.

According to the invention the deflection member and the end of the distributor pipe are provided with coupling means for establishing a detachable connection in order to prevent a relative movement of the deflection member and the distributor pipe.

In a further emobodiment of the invention each of the ends of the bracket to be secured to the distributor pipe has a rectangular cross-section so that each end fits in two parallel, axially extending flanges arranged on the outer wall of the distributor pipe, a pin being passed through the flanges and the associated end.

Simply by withdrawing the pin from the flanges and by subsequently disengaging the coupling means between the deflection member and the bracket, this part can be readily exchanged.

In order to avoid erroneous mounting of the new bracket with its deflection member, which would have an undesirable effect on the distribution pattern of the material to be spread, the part of the coupling means secured to the distributor pipe is, in accordance with the invention, off-set relatively to the coupling flanges of the bracket.

Figure 2:
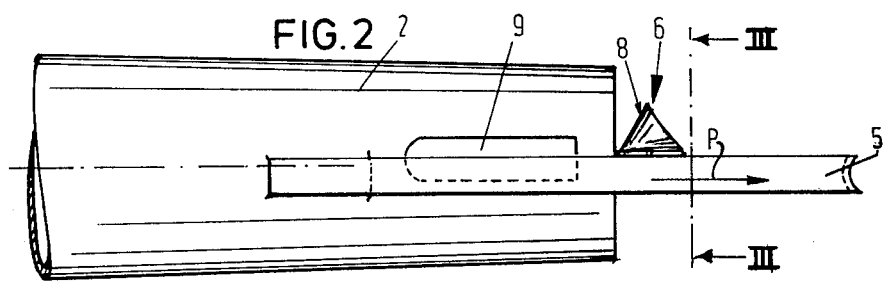
Figure 3:
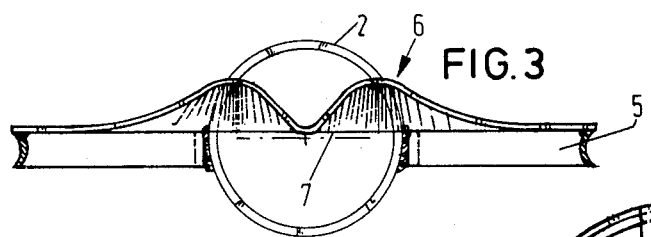
Figure 4:
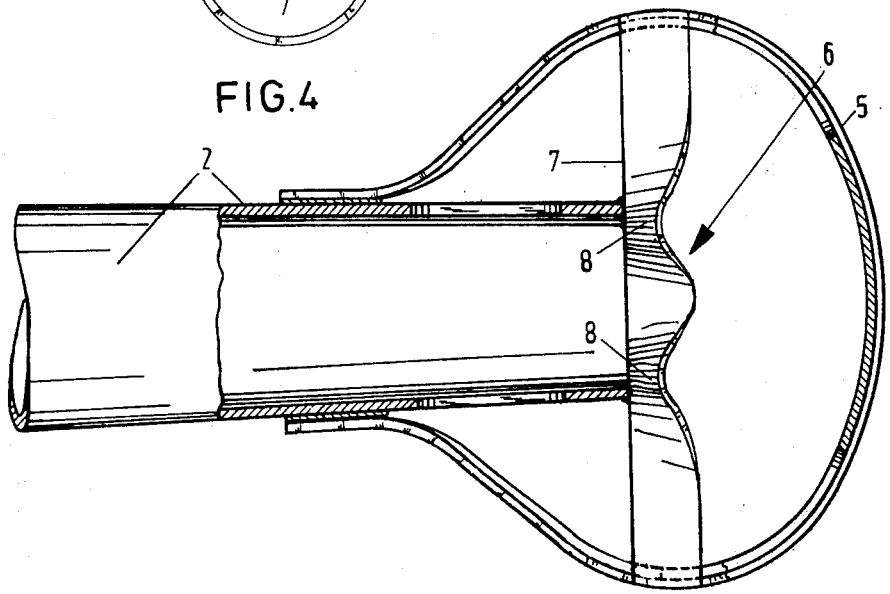
Figure 5:
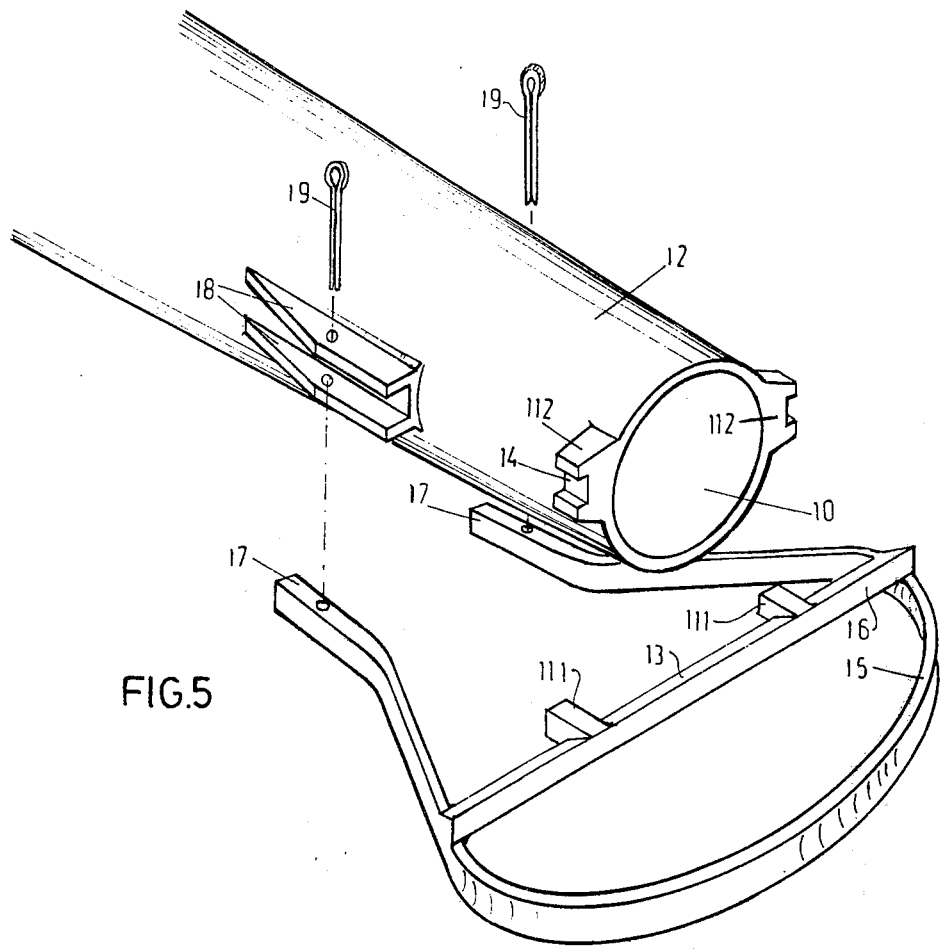

Further features of the invention will be set out hereinafter with reference to the drawing of two embodiments. In the drawing:

FIG. 1 is a side elevation of a carried spreading device, in accordance with the invention, FIG. 2 shows a detail of the end of the reciprocatory distributor pipe, FIG. 3 is a sectional view and an elevation taken along the line III—III in FIG. 2, FIG. 4 is a plan view of the end of the pipe shown in FIGS. 2 and 3, FIG. 5 is a perspective view of a second embodiment of a bracket and deflection member.

The spreading device shown in FIG. 1 comprises a hopper 1 containing the material to be spread and having an outlet port in its bottom. This outlet port communicates with a distributor pipe 2, adapted to swing to and fro, which swinging movement is obtained from a crank mechanism 3 driven by a driving shaft 4 which may be, for example, the power take-off shaft of an agricultural tractor.

FIGS. 2, 3 and 4 show in detail the outlet end of the distributor pipe 2 with the bracket 5 arranged around the same. The deflection member 6 provided in accordance with the invention is held by the bracket 5 so that it is located behind the outlet opening of the distributor pipe 2.

In a preferred embodiment the deflection member 6 is formed by a strip, whose ends are fastened flat to the bracket 5 and which is locally twisted or undulated between said ends. In the embodiment shown the front rim 7 is straight, but in accordance with the material to be spread this front rim 7 may also be undulated. Moreover, in the embodiment shown the rear rim is bent upwardly so that a double waveline is obtained, the peaks of which are substantially aligned with the upright wall portions of the distributor pipe 2 (see FIG. 3). Since the major portion of the material to be spread travels along the upright wall portions of the distributor pipe 2, the embodiment shown in the drawing provides maximum deflection effect.

From FIG. 2 it will be apparent that the operative surface of the deflection member 6 is at an acute angle to the direction of distribution indicated by the arrow P. The largest angle lies at the highest point of the rear rim of the deflection member 6 (see FIG. 3).

It should be noted that the deflection member 6 is struck not only by the material directly emerging from the hindmost outlet opening of the distributor pipe 2 but also by the material emerging through the lateral outlet openings 9 in the upright wall portions of the distributor pipe 2 and impinging upon the portions of the deflection member 6 lying between the distributor pipe 2 and the ends thereof.

Since the bracket may be slightly resilient and may therefore shift with respect to the exhaust end of the distributor pipe 2 because of the rapid oscillations of the pipe, it may be preferred to fasten the deflection member 6 to the pipe 2. In this way the correct position of the deflection member 6 relative to the exhaust end of the distributor pipe 2 is maintained.

FIG. 5 shows the exhaust end of the distributor pipe 2 with the bracket 15 to be arranged around said pipe and holding a deflection member 16, which are shown in detail. The free ends 17 of the bracket 15 are fastened to the sidewall of the distributor pipe 12. Each end 17 has a rectangular cross-section and fits between two projecting, axially extending flanges 18 arranged on the outer wall of the distributor pipe 12. The flanges as well as each end 17 have a hole for receiving a pin 19. Owing to the rectangular cross-section of the end 17 and to the corresponding U-shaped opening between the flanges, a firm assembly is ensured despite the use of only one fastening pin 19 so that any undesirable movement between the bracket 15 and the end of the distributor pipe 12 is avoided.

If the bracket 15 is made from elastic material, for example, a synthetic resin, the position of the deflection member 16 relative to the exhaust opening 10 of the distributor pipe 12 may vary due to the rapid reciprocatory movement of the distributor pipe 12. In accordance with the invention both the deflection members 16 and the end of the distributor pipe 12 are provided with coupling means 111 and 112 respectively. The part of the coupling means fastened to the deflection member is formed by two lugs 111 extending one on each side of the distributor pipe 12 to the front and projecting from the operative face 13 of the deflection member 16. These lugs 111 fit in recesses 14 of the parts 112 of the coupling means fastened to the distributor pipe 12. FIG. 5 shows that after mounting of the lugs 111 in the recesses 14 of the ears 112 any horizontal or vertical movement of the deflection member 16 relative to the exhaust opening 10 is avoided. Any potential axial movement of the deflection member 16 with respect to the distributor pipe 12, which may still be allowed in this embodiment, is negligibly small in view of the shape of the bracket 15. Nevertheless, the lugs 111 may furthermore have a profile gripping around the ears 112 in order to prevent such an axial movement.

It is furthermore apparent from FIG. 5 that mounting of the bracket 15 and the deflection member 16, which are preferably cast as a single unit, is particularly simple. After the lugs 111 are arranged in the recesses 14 of the ears 112, the ends 17 can be urged in between the flanges 18 and the pins 19 can be inserted.

Within the scope of the invention the coupling means may be formed by a pin-hole connection, in which either the distributor pipe or the deflection member are provided with a pin and a hole respectively.

What is claimed is:

1. A device for spreading material such as fertilizer, comprising in combination:
    a hopper for containing the material to be spread and having an outlet port;
    a horizontally extending distributor pipe communicating with said outlet port and extending therefrom along the axis of the pipe to terminate in a discharge mouth;
    means for oscillating said distributor pipe about a vertically extending pivot axis so that said discharge mouth oscillates back and forth along a horizontally extending path;
    a bracket secured to said distributor pipe and including portions spaced laterally from either side of said discharge mouth; and
    a deflection member secured to and extending between said portions, said deflection member having a surface facing said discharge mouth and defining a bottom edge traversing said discharge mouth, said surface being inclined to lie obliquely with respect to the axis of said distributor pipe.

2. A device as defined in claim 1 wherein said surface of the deflection member is undulated.

3. A device as defined in claim 2 wherein said surface defines a valley substantially aligned with the axis of said pipe and a pair of peaks substantially aligned with the opposite sides of said discharge mouth.

4. A device as defined in claim 1 wherein said portions of the bracket are joined by an arcuate portion.

5. A device as defined in claim 1 wherein said distributor pipe includes means receiving said portions of the bracket for removably attaching said portions thereto and wherein said discharge mouth and said deflection member define mutually interengageable means for locating the deflection member positively with respect to the discharge mouth.

6. A device as defined in claim 5 wherein said mutually interengageable means permits the bracket and deflection member assembly to be connected only in one position on the distributor pipe.

7. A device as defined in claim 6 wherein said mutually intergageable means comprises ears on the opposite sides of said discharge mouth and lugs projecting forwardly from said deflection member.

8. A device as defined in claim 4 wherein said bracket and said deflection member are of one piece, cast construction, said deflection member being of bar-like form and lying on top of said bracket with said bottom edge of the deflection member lying in a plane common with the upper surface of said bracket.

9. A device as defined in claim 8 wherein said distributor pipe includes means receiving said portions of the bracket for removably attaching said portions thereto and wherein said discharge mouth and said deflection member define mutually intergageable means for locating the deflection member positively with respect to the discharge mouth.

10. A device as defined in claim 9 wherein said mutually interengageable means permits the bracket and deflection member assembly to be connected only in one position on the distributor pipe.

* * * * *